United States Patent [19]

Cooper, III

[11] Patent Number: 5,529,210

[45] Date of Patent: Jun. 25, 1996

[54] METHOD AND APPARATUS FOR DISPENSING CUP-LIKE MEMBERS

[76] Inventor: Clayton C. Cooper, III, 16 Bittersweet La., Clifton Park, N.Y. 12065

[21] Appl. No.: 268,787

[22] Filed: Jun. 29, 1994

Related U.S. Application Data

[63] Continuation-in-part of Ser. No. 980,574, Nov. 23, 1992, Pat. No. 5,325,993.

[51] Int. Cl.$^6$ ........................................... B23Q 7/04
[52] U.S. Cl. .................................. 221/211; 221/223
[58] Field of Search ................................ 221/211, 210, 221/278, 272, 36, 223, 251

[56] References Cited

U.S. PATENT DOCUMENTS 2,937,786  5/1960  Muller .................................. 221/211
3,940,017  2/1976  Bengstrom .......................... 221/211

*Primary Examiner*—Kenneth Noland

[57] ABSTRACT

Apparatus for effecting: a) selective withdrawal of cup-like members and the like in which bakery products such as muffins or cupcakes are baked, wherein each cup-like member nested in a stack is subjected to a suction within the cavity defined by the member to cause the sidewall thereof to move away from the next member in the stack while being moved from the stack, and providing positive air pressure between and around the sidewall of any such next member which is frictionally engaged to the member being withdrawn, thereby to force such next member out of frictional engagement and back into its nested position; and b) apparatus including high production apparatus for dispensing cup-like members and the like into bakery receptacles.

5 Claims, 10 Drawing Sheets

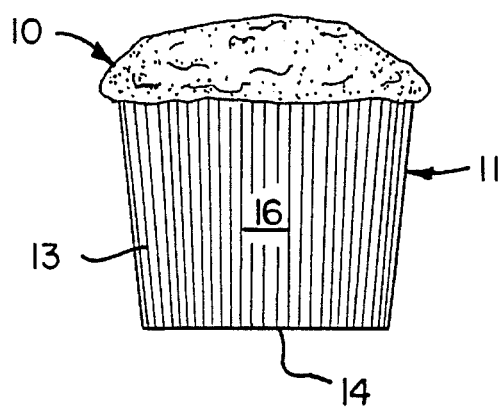
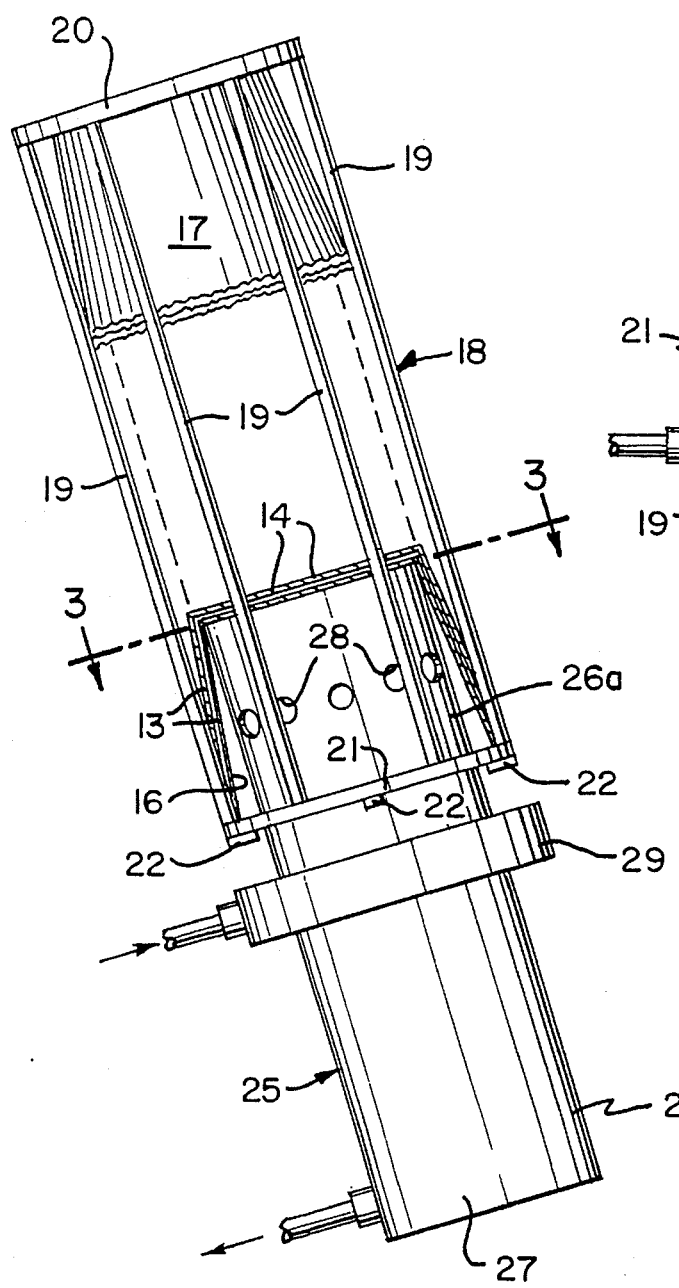
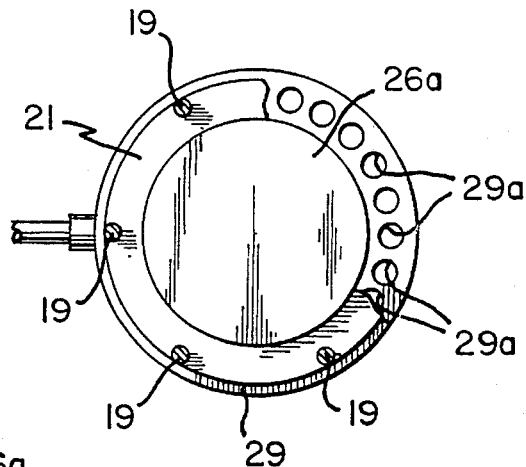

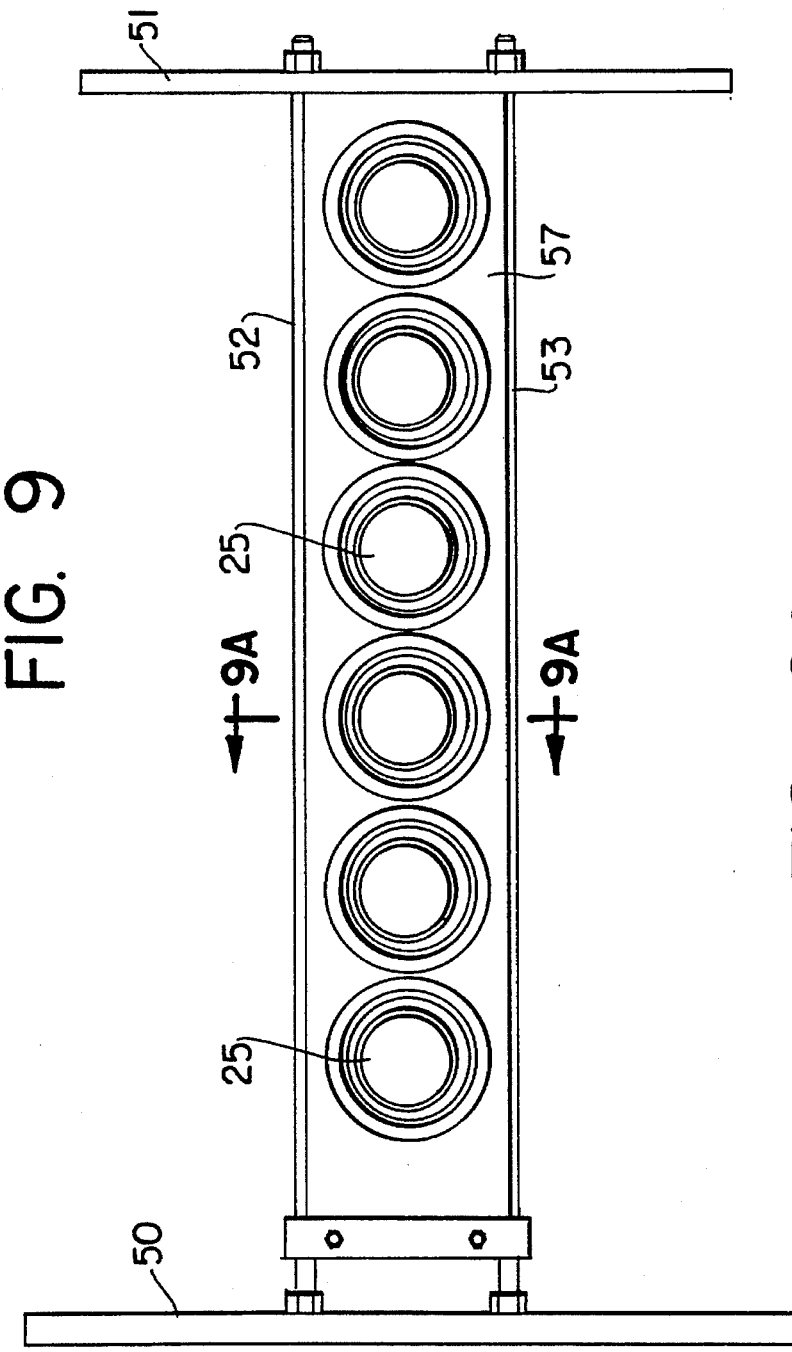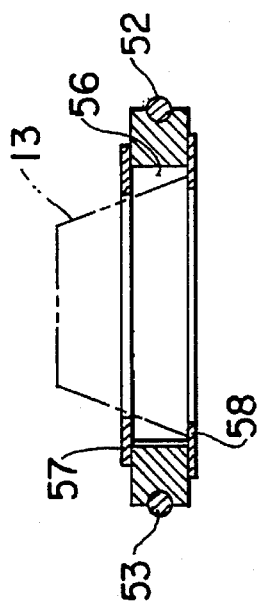

METHOD AND APPARATUS FOR DISPENSING CUP-LIKE MEMBERS

CROSS-REFERENCE TO RELATED APPLICATIONS

This application is a CIP of Ser. No. 07/980,574 filed Nov. 23, 1992, now U.S. Pat. No. 5,325,993,

BACKGROUND OF THE INVENTION

Bakery products such as muffins, cupcakes, pound cake and the like are usually baked in a fluted paper shell which is specially treated to withstand baking temperatures and ready release from baking tins or receptacles. While various attempts have been made to provide automatic machinery to dispense such paper shells, such attempts have been only marginally successful. It will be understood that to automate the dispensing of such shells, liners or cup-like members is particularly difficult since a nested stack of several hundred such members, each fluted cup nested within the next adjacent, tends to be tightly and frictionally bound. Furthermore, when a cup is extracted from the stack, the next adjacent cup or cups usually are dislodged due to such frictional engagement and more than one such cup will be dispensed.

As mentioned, attempts to automate the dispensing process have been made, for example, U.S. Pat. No. 3,540,621 illustrates such an attempt; however, this equipment will not consistently dispense only one cup, shell or member at a time, over long periods of time.

There is a vital and universal need for reliable automatic cup dispensing equipment in the baking industry. In addition to factory use by baking companies, inexpensive, reliable equipment of this type is also needed in nearly every bakery. The unfortunate fact is that such paper shells are at the present time dispensed manually in factories and in bakeries alike. The present invention provides simple, foolproof and reliable automated equipment which solves this problem.

SUMMARY OF THE INVENTION

In accordance with the present invention, method and apparatus are herein disclosed for individually separating nested cup-like members from a stack thereof, wherein the stack is first secured, for example, in a refillable magazine having an open end and wherein the interior cavities of the nested shells or cups face the open end of the magazine. The cup or shell nearest the magazine opening is retained therein by means such as a plurality of circumferentially arranged fingers which extend radially into the magazine opening. The cups or shells used in baking are usually frusto-conical with the open end of each such member having a larger dimension than its base.

In accordance with the present invention, the dispensing/extraction process is initiated by the insertion of a suction means (in the illustrated embodiment, a cylinder) having suction ports in an annular pattern arranged about that portion of the cylinder which is inserted within the interior of each cup. The cylinder is of a slightly smaller diameter than the base diameter of a cup or shell so that when suction is applied the diverging sidewall of the cup will be drawn inwardly toward the cylinder. This effectively reduces the width of the shell so that it may pass through the opening in the magazine. However, the nested cups are generally tightly engaged, each adjacent one within the next adjacent one, so that engagement of the suction means with the cup nearest the opening usually causes at least the next adjacent cup to be pulled from the stack at the same time. To solve this problem, the invention uniquely provides positive air flow directed externally of the cup engaged by the suction source which separates the cup so engaged by the suction means from the next adjacent one or ones thereof. The positive flow furthermore will not only separate the respective members but will force the next adjacent members back into the magazine to await their respective turn to be withdrawn. The present invention also provides means including high production means, to transport cup-like members and to dispense such members into baking receptacles.

BRIEF DESCRIPTION OF THE DRAWING

FIG. 1 illustrates a muffin or cupcake in its paper liner or shell, the dispensing of which is the subject of the present invention;

FIG. 2 illustrates an apparatus constructed according to the present invention in the initial phase of dispensing cup-like shells nested in a stack and retained in a magazine;

FIG. 3 is a view taken in the direction of arrows 3—3 of FIG. 2;

FIG. 9 is a partial top view of the machine of FIG. 8;

FIG. 9A is a cross-section of an individual cup retainer;

DESCRIPTION OF THE PREFERRED EMBODIMENT

Figure 4:
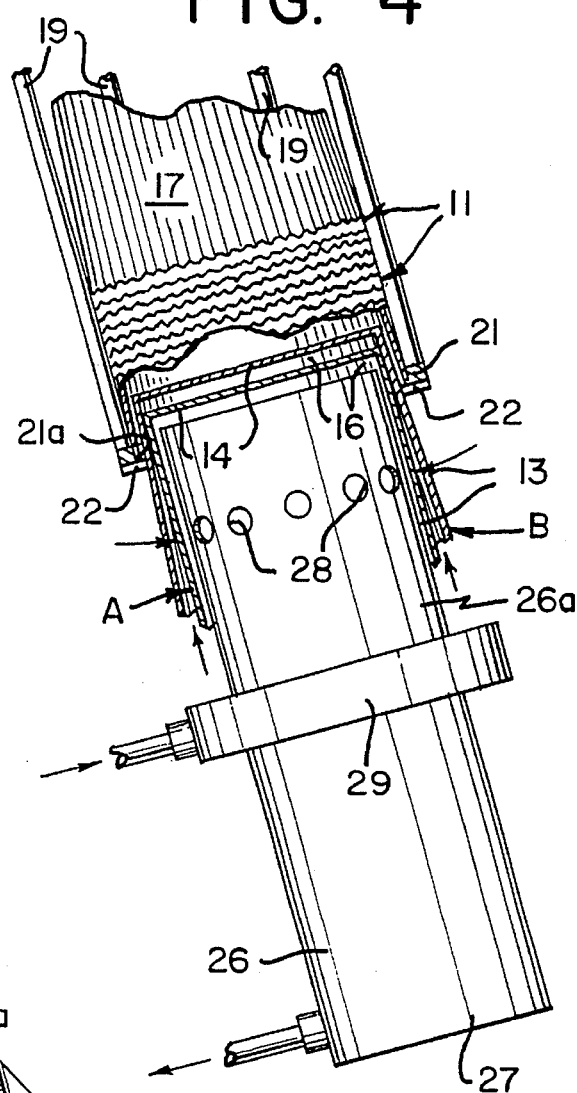
FIG. 4 illustrates the apparatus of the invention as such apparatus progressively withdraws a cup-like shell from the magazine.

Referring to the drawing, FIG. 1 illustrates a bakery product (muffins or cupcake) 10 which has been baked within a fluted shell or cup 11. The cup 11 is conventionally made of paper which has been specially constructed and treated to withstand the temperatures of the baking process and to permit ready release of the product 10 and the surrounding cup 11 from the receptacle 12 (FIG. 7) in which it is baked. The present invention concerns automatic, sequential dispensing of large numbers of such cups 11 (or functional equivalents) individually from a nested stack into bakery receptacles, baking platforms or the like.

FIGS. 2–7 illustrate a plurality of such cups 11 which are so dispensed in accordance with the present invention. Each cup 11 has been manufactured to have a fluted or crimped sidewall 13 and a flat base 14 which define a cavity 16 generally frusto-conical in shape. Cups 11 are uniform in size and shape and thus may be nested each within a next respective cavity 16 to form a stack 17 which may include several hundred cups 11. It will be understood that in such an arrangement, the fluted sidewalls 13 of adjacent cups 11 tightly engage and greatly inhibit individual automatic separation of each cup 13 from a stack 17 thereof.

The stack 17 of cups 13, as illustrated, is held within a magazine 18 comprising a plurality of rods 19 which circumferentially surround sidewalls 13. The magazine 18 has a base plate 20 which is removable so that additional cups 13 may be added from time to time to fill the magazine as cups are dispensed therefrom. At the opposite end of the magazine, rods 19 are permanently connected to a plate 21 defining a circular opening 21a therein which permits egress of cups 13 therefrom. Fingers 22 (four to six) are attached to plate 21 and extend radially inwardly within opening 21a. Fingers 22 effectively operate to restrict the diameter of opening 21a to assist in the sequential individual withdrawal from magazine 18 of cups 13 by the cup separation and dispensing apparatus 25.

Apparatus 25 includes a central, hollow cylindrical section 26 which preferably includes a suction source known as a vortex generator 27. Section 26 defines one end 26a which as illustrated may be inserted within a downwardly facing cavity 16 of the lowermost cup 13 within stack 17. Preferably, the diameter of section 26 is essentially the same (allowing for tolerances) as the diameter of each cup base 14. Section 26a defines a plurality of annular ports 28 which are connected to the vortex generator 27.

Apparatus 25 includes a hollow, annular ring 29 which as illustrated is connected to an external source of air pressure which directs a controllable flow of air pressure into ring 29. Ring 29 defines a plurality of ports 29a for the direction of air flow therefrom upwardly and parallel to the longitudinal axis of section 26a.

Figure 5:
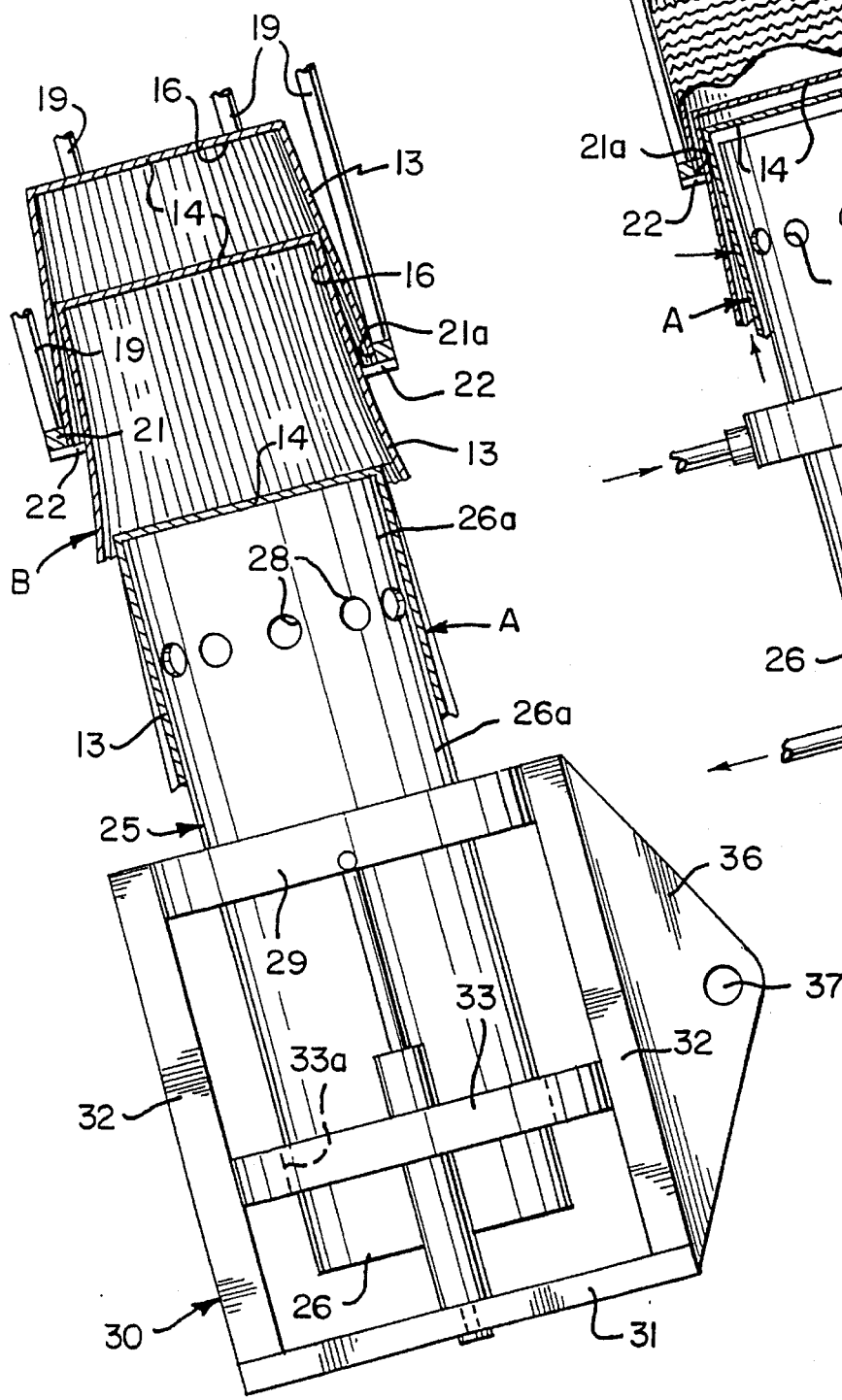
FIG. 5 illustrates the final phase of withdrawal of a shell and apparatus for moving the withdrawal means.

FIGS. 2–5 illustrate the cup dispensing apparatus 25 as it operates to withdraw an individual cup 13 from stack 17 and magazine 18. For simplicity, the means for moving the apparatus 25 toward and away from magazines 18 has been shown in FIG. 5 and shall be described later. Referring to FIG. 2, section 26a has been shown having been inserted within the cavity 16 of the cup nearest to the opening 21a in magazine 18. It will be noted that without suction being applied from ports 28, the sidewall 13 of such cup rests upon fingers 22 which prevent such cup from moving from the magazine. However, it will be seen that when suction is initiated, the walls of a cup 13 surrounding section 26a will be pulled toward (FIG. 4) and against (FIG. 5) the surface of section 26a to permit a cup 13 to be withdrawn from magazine 18 as cylinder 26 is moved away from magazine 18. FIGS. 4 and 5 show how apparatus 25 solves withdrawing a single cup A from magazine 18 notwithstanding the fact that a next adjacent cup B has, due to frictional contact, been partially withdrawn from magazine 18 at the same time. The withdrawal force acting on cup A is suction provided by ports 28, whereas the withdrawal force acting on cup B is contact between the sidewalls 13 of cups A and B. Positive air pressure from ports 29a in ring 29 will act in two ways upon cup B to a) separate the frictional engagement between the respective sidewalls of cups A and B and b) to drive cup B back into magazine 18. As indicated in FIG. 4, pressure from ports 29a shall flow between the engaged sidewalls and also outside the sidewall of cup B, the latter acting aerodynamically in concert with pressure between the respective sidewalls. As shown in FIG. 5, the upward pressure from ports 29a has driven cup B away from cup A and into the magazine where further upward pressure will force the lower edge of cup to rest upon and be restrained by fingers 22 until the next dispensing cycle has begun.

Referring to FIG. 5, apparatus 25 is provided movement in two directions within carriage 30 comprising a base 31 rigidly secured to longitudinal members 32 at one end. The opposite ends of such members slideably engage and laterally support ring 29. Plate 33 is attached to members 32 and has been provided with a circular opening 33a to permit retraction therethrough of section 27 of apparatus 25 by piston and piston rod 34 and 35. Such movement shall be automatically controlled by sensors well-known in the art. The second kind of movement of apparatus 25 provided by carriage 30 is rotation of apparatus 25 from and to the respective positions of FIG. 2 and FIG. 7. To accomplish such rotation carriage 30 is connected by a bracket 36 to rotary actuator 37 which shall be secured to stationary adjacent structure (not shown).

Figure 6:
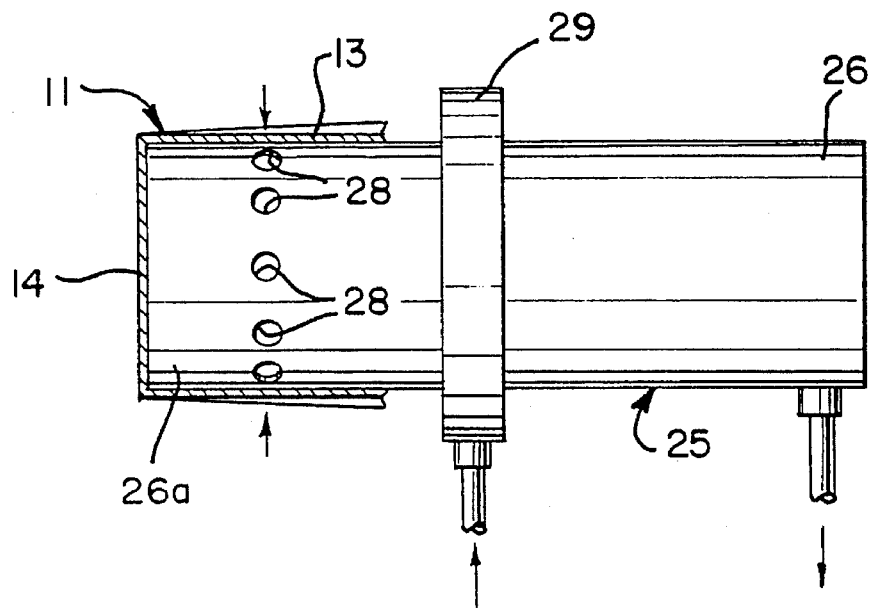
FIG. 6 illustrates an intermediate position of the shell withdrawal apparatus.
Figure 7:
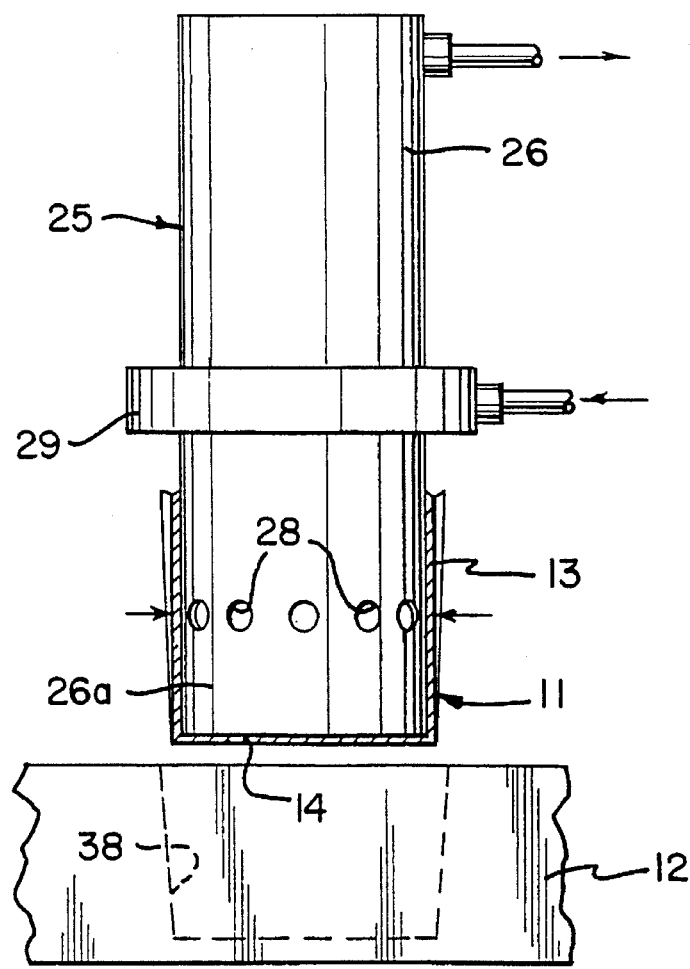
FIG. 7 illustrates the shell dispensing position of the apparatus of the invention.

FIG. 6 illustrates rotation of apparatus 25 from the position of FIG. 5 (full withdrawal from magazine 18 to an intermediate position). FIG. 7 illustrates further rotation of such apparatus to a position in which it shall dispense a cup 13 into a receiving cavity 38 in a receptacle 12. In order to do so, suction from ports 28 shall be discontinued which will cause cup 13 to begin to assume its original frusto-conical shape (see dotted outline). Simultaneously, positive pressure will flow from ports 29a to literally "blow" cup 13 into cavity 38 completing the dispensing cycle.

Figure 8:
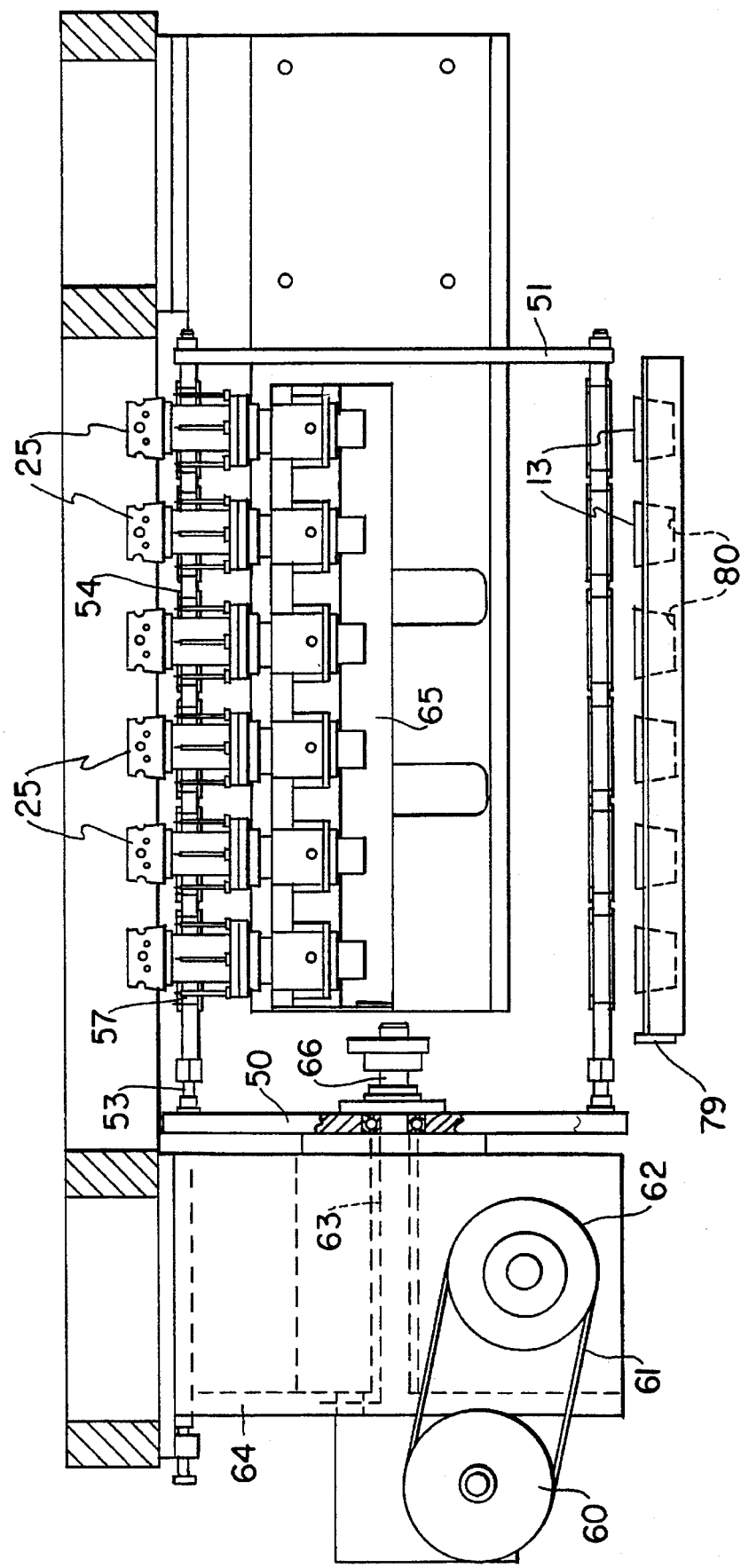
FIG. 8 is a front elevation of a high production machine for dispensing cup-like members into bakery receptacles.
Figure 10:
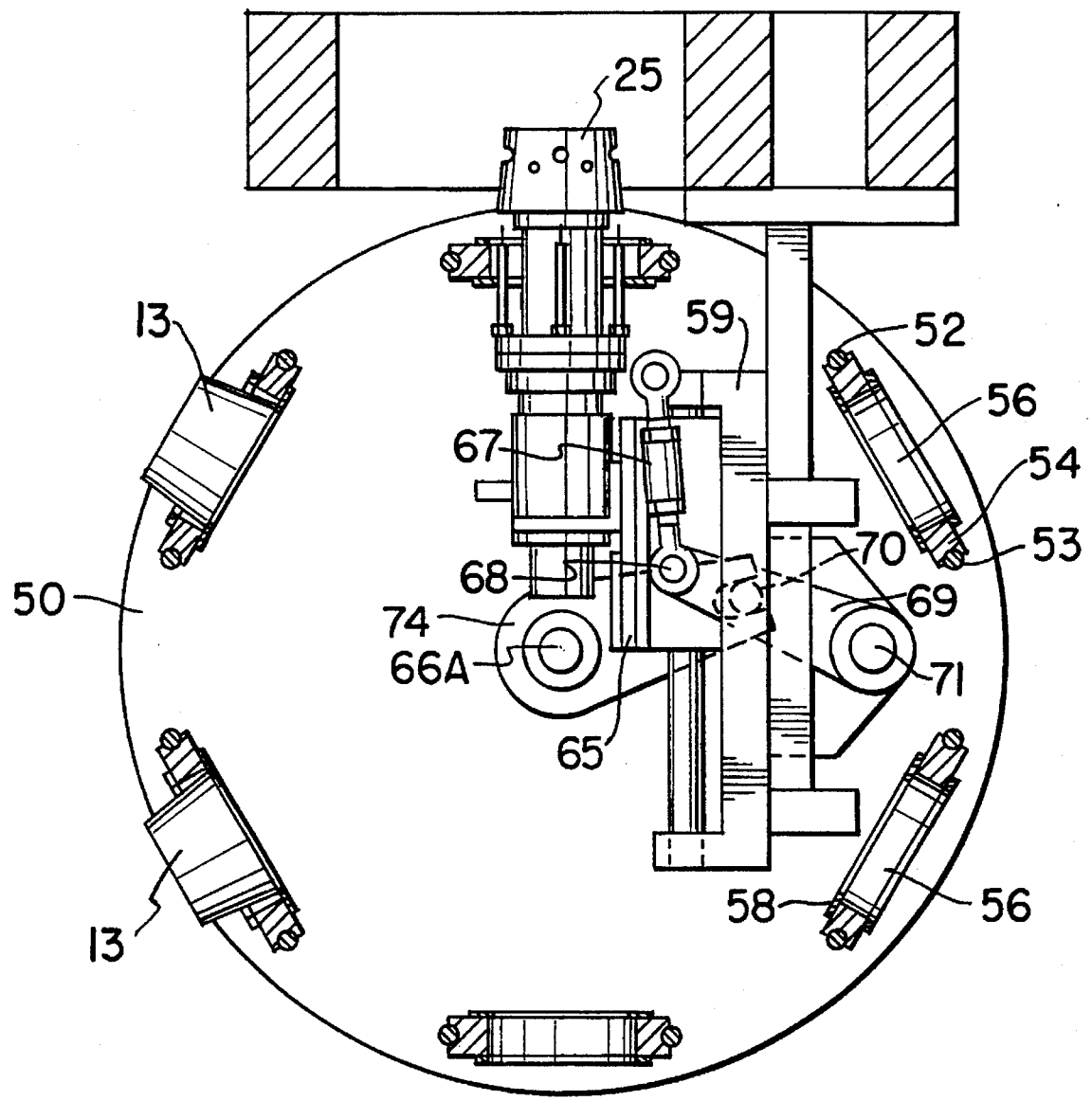
FIG. 10 is a partial side view of the machine of FIG. 8.

FIGS. 8–12 illustrate high production cup dispensing machinery incorporating the principles of the present invention: FIG. 8 is a front elevation thereof; FIG. 9 a partial top view thereof; and FIG. 10 is a section through the top view of FIG. 9. Referring initially to FIGS. 8–10 the high production machine illustrated includes a main disc 50 and an outer disc 51 which are attached to pairs of support rods 52, 53 extending laterally between each disc 50 and 51. Between rods 52, 53 are cup retainer plates 54 which define therein circular cup retainer openings 56 (see also FIG. 9A). Secured to the upper surface of plates 54 around each opening 56 is a plate 57 through which a cup 13 may freely pass when drawn therethrough by an extractor head 25. Secured to the lower surface of each cup retainer plate 54 and about each opening 56 therein is a circular stripper plate 58 which is of a sufficiently reduced diameter to effect stripping of a cup 13 from an extractor head 25 as the head 25 moves entirely through one of the cup retainer openings 56. Such movement of each cup 13 through an opening 56 shall be coordinated with cessation of suction from extractor head 25, thereby releasing each cup into a cup retainer opening 56 and permitting expansion of the sides of a cup 13 to a diameter greater than the diameter of the opening in stripper plate 58. It will be further understood that the described deposition of cups 13 into respective retainer openings 56 in plates 54 shall be simultaneously achieved by the plurality of extractor heads 25 as illustrated.

Figure 11:
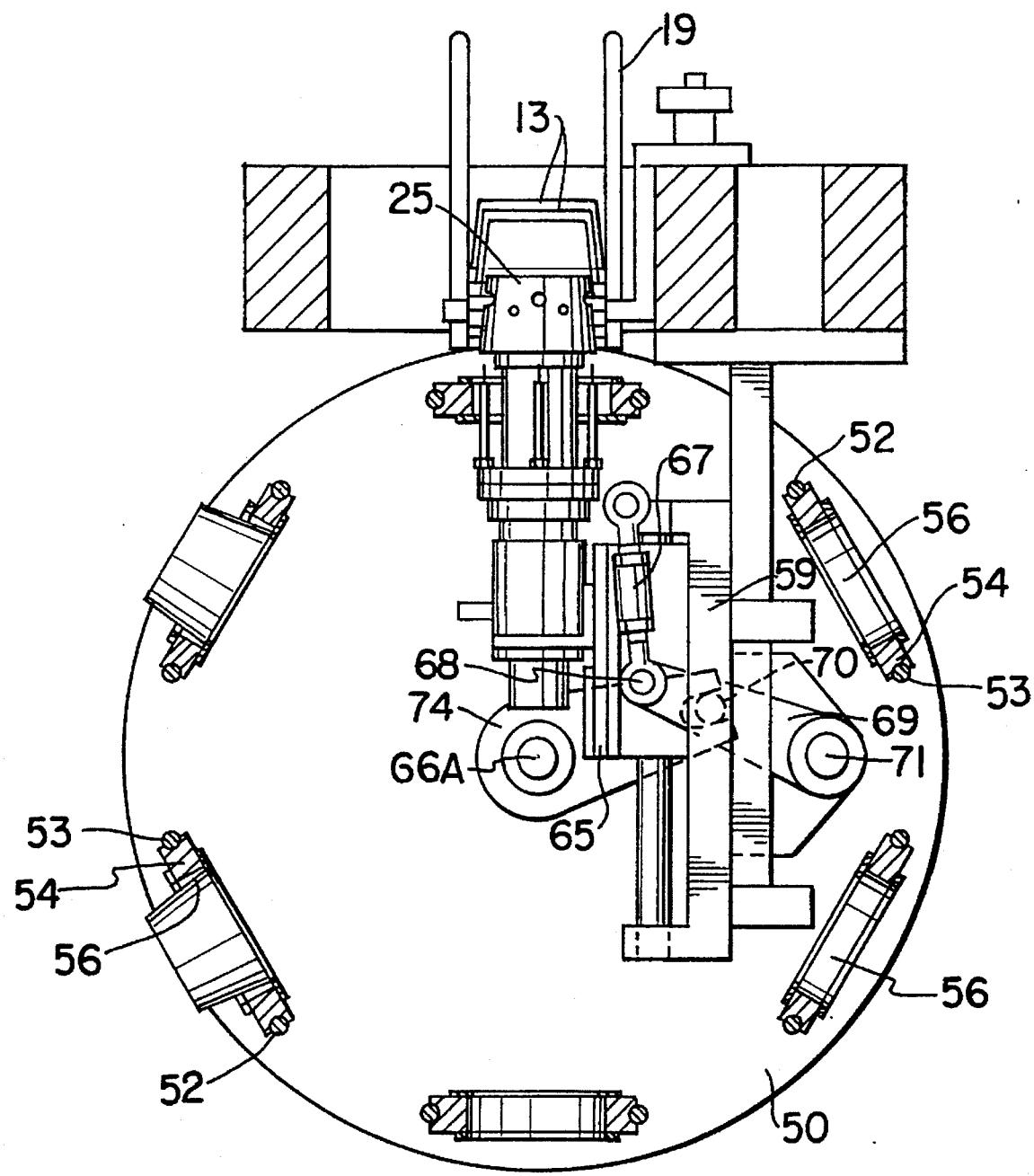
FIG. 11 is a side view of a cup extractor head and a cup retaining means for holding a plurality of cup-like members wherein the extractor head is in the top dwell position.
Figure 12:
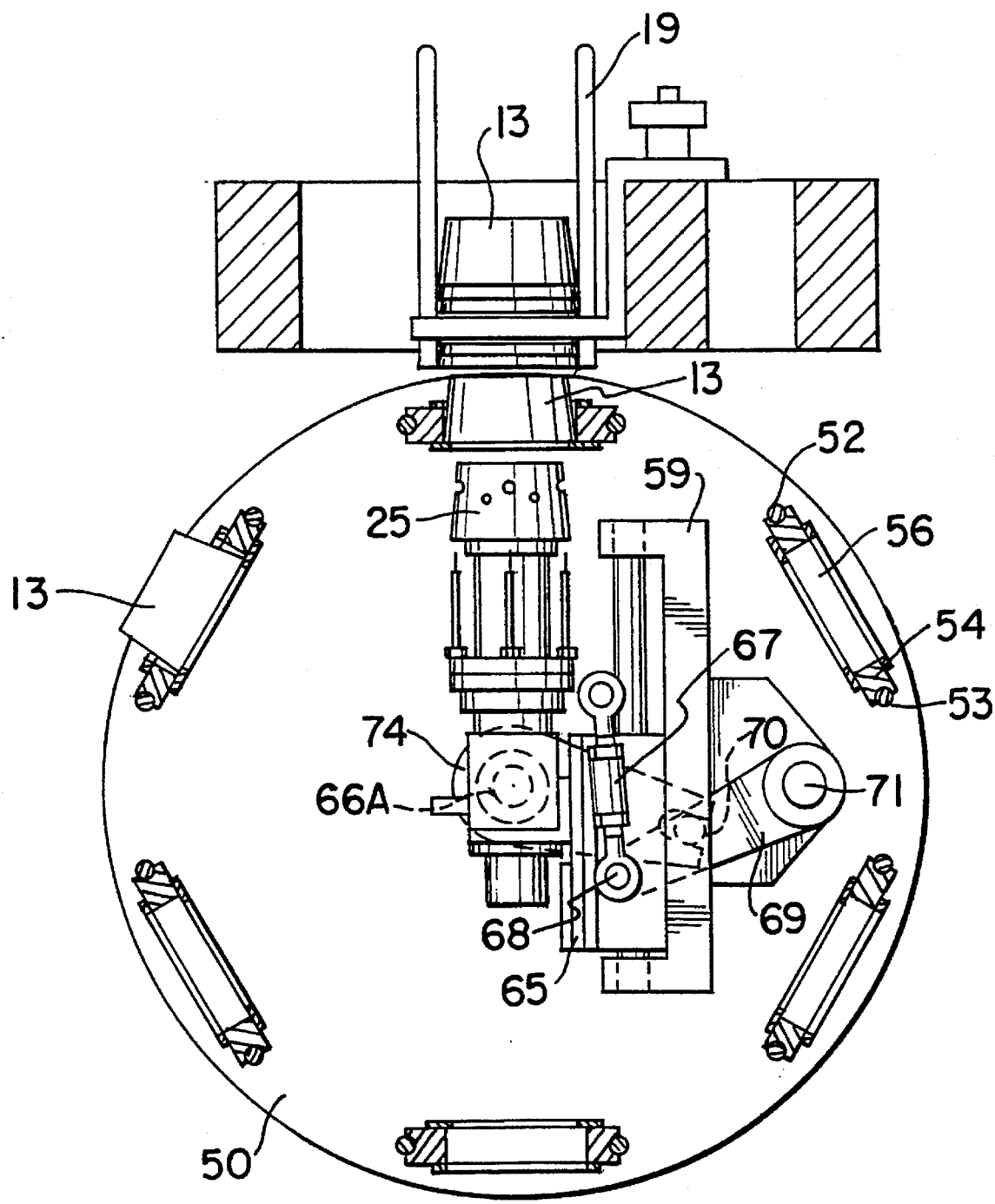
FIG. 12 is a view similar to FIG. 11 wherein the extractor head is in the bottom dwell position.

Referring to FIGS. 10, 9A, 11 and 12, the arrangement of cup retainer openings 56 in plates 54 can be more clearly understood with respect to a single extractor head 25. FIG. 11 illustrates an extractor head 25 in its top dwell position and is similar to the sectional view shown in FIG. 10. FIG. 12 illustrates the extractor head 25 in its bottom dwell position. In the top dwell position, the extractor head is positioned to withdraw a cup 13 from a stack thereof as heretofore described.

FIGS. 10, 9A, 11 and 12 further illustrate the arrangement of cup retainer plates 54, cup retainer openings 56 and stripper plates 58. In the present arrangement, there are six retainer plates 54, each attached to circular end discs 50, 51 for counter-clockwise rotation of discs 50, 51 together with cup retainer plates 54 as viewed in the drawing. Six retainer plates 54 are attached to discs 51 spaced apart at angular intervals of 60°. Referring to FIG. 8 it will be seen that to the left of main disc 50 there has been diagrammatically illustrated a pulley 60 which is connected by belt 61 to a pulley 62, drive train shafts and gearing 63, the latter enclosed within gear housing 64. A central drive shaft 66 is connected to the center of main disc 50. In the illustrated embodiment, (FIGS. 10–12) power fed to main disc 50 shall move discs 50,51 counter-clockwise. Movement of extractor heads 25 from the top dwell position of FIG. 11, to the bottom dwell position of FIG. 12, shall be accompanied by 60° rotation of discs 50,51; but only after heads 25 have reached the bottom dwell position and are clear of retainer plates 54.

Referring to FIGS. 11 and 12, it will be seen that each of the extractor heads 25 are attached to a plate 65 extending laterally behind the array of heads 25, as viewed in FIG. 8. Plate 65 is connected at each end (adjacent respectively to discs 50 and 51 to oscillator plates 59 connected to lift linkages 67, the lower end 68 being connected to the end of lift arm 69 carrying cam follower 70. Lift arm 69 is pivotally attached to an oscillator pivot shaft 71. Shaft 66A is attached to crank arm 74 to effect movement of the various members just identified to cause ganged oscillating movement of heads 25 from the top dwell position to the bottom dwell position. Shaft 66A is concentric with shaft 66. Discs 50,51 and cup retainer plates 54 shall be rotated in increments of 60° but only after heads 25 have reached their bottom dwell position. As each of the ganged (side by side) heads 25 move from the top dwell position, each extracts a cup 13 from a respective stack; and as each head moves towards its bottom dwell position, a cup 13 shall be positioned in a cup retainer opening 56 as a cup is stripped from head 25 by stripper plate 58.

Figure 13:
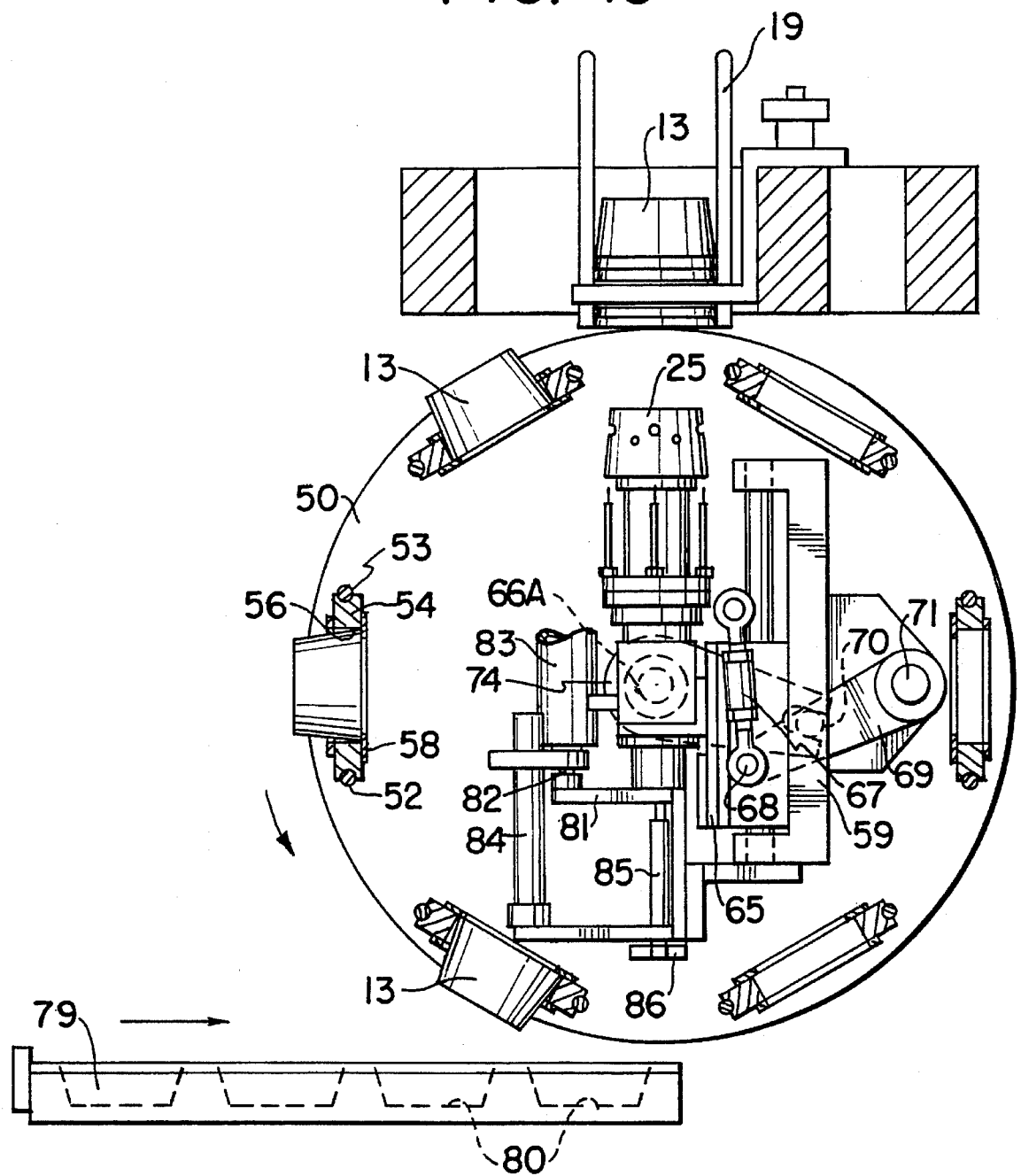
FIGS. 13 and 14 are views similar to FIGS. 11 and 12 which illustrate the sequence of dispensing cup-like members into a bakery receptacle.
Figure 14:
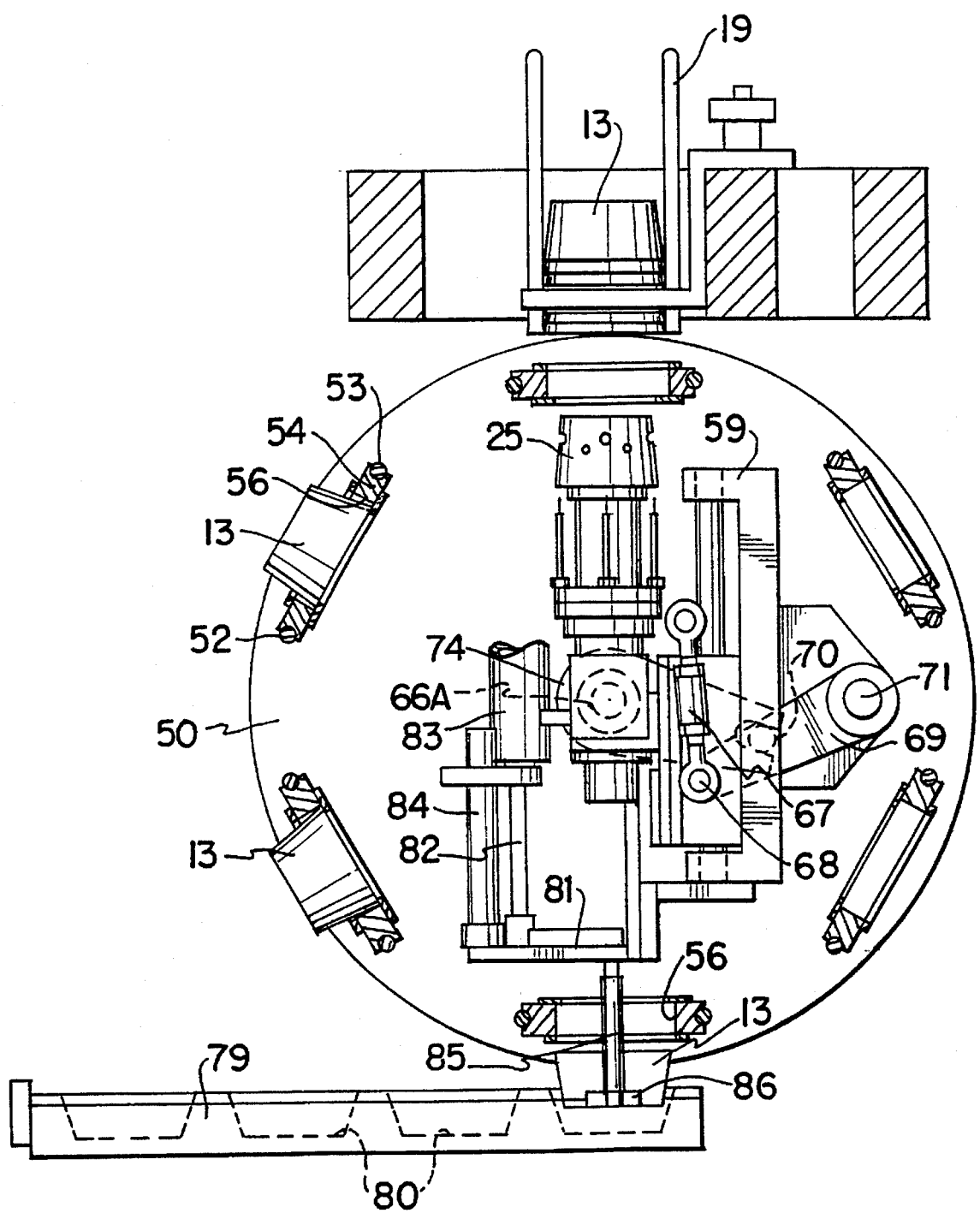

As seen in FIG. 8, a bakery receptacle 79 having a plurality of rows of cavities 80 therein has been arranged for movement beneath the illustrated assembly. As rotation of discs 50,51 and attached cup retainer plates 54 incrementally progresses, cups 13 shall be progressively loaded into retainer openings 56 in cup inverted positions (top center) until at the bottom center position, each cup shall face upward. At such point, each cup 13 shall be thrust from its retainer opening 54 into a cavity 80 in receptacle 79 as such receptacle passes beneath the illustrated machine. FIGS. 13 and 14 illustrate this operation. Associated with each extractor head 25 is a plunger 86 mounted upon an arm 81 at one end thereof, the opposite end being attached to a piston 82 which is driven by hydraulic cylinder 83. Guides 84, 85 have been provided to assure parallel vertical travel of piston 82 and plunger 80. FIG. 13 illustrates movement of a bakery receptacle 86 beneath the rotating array of cups 13 in respective retainer openings 56. As the position of FIG. 14 is reached, cylinder 83 shall be actuated to cause plunger 80 to deposit a cup-like member 13 into a cavity in receptacle 86. It will be understood that the adjacent cup retainer openings beneath each extractor head 25 shall simultaneously be discharged so that a row of six such cavities shall be filled with respective cup-like members.

It will be understood that the foregoing description has been of a particular embodiment of the invention and has been representative as to the shape of the members being dispensed. While the illustrated embodiment has shown the dispensing of a cup-shaped member, it will be readily understood that any such member having a concavity therein, nested one within another essentially identical member, would lend itself to the practice of the disclosed invention by effecting obvious variation of the shape of the dispensing portion in contact with such member. Accordingly, in order to understand the scope of the present invention, reference should be made to the appended claims.

I claim:

1. An apparatus for separating and dispensing cup-like members individually from a nested stack thereof comprising a) means for securing and retaining said nested stack to present for withdrawal therefrom one each of said members sequentially in seriatim, said means including access to the cup-like interior of each said member for separation from and withdrawal of each said member from the cup-like interior of the next adjacent member in said nested stack;

b) said means for securing and retaining said nested stack including a magazine for holding a plurality of said members in a nested stack, said magazine providing means preventing egress sequentially of each cup-like member in a direction away from its nested position within the cup-like interior of the next adjacent cup-like member, said means defining an opening for egress from said stack securing and retaining means less than the nested lateral edge distance across the interior of each said cup-like member in its nested position within said stack;

c) means for effecting sufficient collapsing movement of the sides of each member to permit withdrawal of said member through said opening from the cup-like interior of the next adjacent member;

d) means for withdrawing in seriatim each member through said opening; and e) means for disengaging the next adjacent member from the member being withdrawn from the stack and for retaining said next adjacent member in the stack.

2. The apparatus of claim 1 wherein said disengaging means includes means to return said next adjacent member into said stack after said member has been partially withdrawn from said opening.

3. Apparatus for separating and dispensing cup-like members from a nested stack thereof seriatim into a bakery receptacle having a cavity therein for the reception of at least one said member comprising:

a) separation means for withdrawing one cup-like member at a time from a nested stack of said cup-like members, said separation means including means for transporting each said cup-like member for a distance after separation thereof from said stack;

b) retaining means therein for receiving each said cup-like member from said separation means;

c) means for moving said separation means toward said cup retaining means and for depositing said cup-like member into said cup retaining means;

d) a bakery receptacle defining at least one cavity therein for the reception of said cup-like member;

e) means for transferring said cup-like member from said cup retaining means into said cavity in said receptacle;

f) said separation means withdraws cup-like members successively from a nested stack thereof wherein the open end of each said member faces toward said separation means and said separation means enters the cup-like interior of each said member prior to withdrawal thereof of said member from said stack;

g) said separation means transports each said cup-like member toward and into a said cup retaining means and said cup retaining means includes means to strip said cup-like member from said separation means upon transport thereof into said cup retaining means; and h) said cup retaining means further includes a plurality of cup retaining means each capable of holding a single cup-like member, said cup retaining means further including means for discharging each said member sequentially into a cavity in said bakery receptacle.

4. The apparatus of claim 3 Wherein the cup retaining means includes a plurality of equi-spaced cup retaining means arranged in a circular pattern about the periphery thereof, means for rotating said cup retaining means to present individual cup retaining means adjacent to said separation means for loading of a cup-like member into one of said retaining means for carrying said cup-like members to a position adjacent to a bakery receptacle arranged to receive said cup-like members.

5. The apparatus according to claim 4 wherein each bakery receptacle includes parallel lengthwise and lateral rows of cavities for the reception therein of cup-like members, a plurality of separating means and associated cup retaining means ganged together for rotation thereof, one each of said associated separating means and cup retaining means arranged immediately adjacent to a lateral row of said cavities, means for moving said receptacle to cause each cavity to pass adjacent to one of said associated separating means and cup retaining means, and means for discharging cup-like members simultaneously from said associated separating means and cup retaining means into each lateral row of cavities.

* * * * *